(12) United States Patent
Heeman et al.

(10) Patent No.: US 11,614,361 B1
(45) Date of Patent: Mar. 28, 2023

(54) HYPERSPECTRAL CAMERA

(71) Applicant: Optiz, Inc., Palo Alto, CA (US)

(72) Inventors: Rob Heeman, Veldhoven (NL); Edwin Wolterink, Valkenswaard (NL)

(73) Assignee: Optiz, Inc., Palo Alto, CA (US)

( * ) Notice: Subject to any disclaimer, the term of this patent is extended or adjusted under 35 U.S.C. 154(b) by 0 days.

(21) Appl. No.: 17/561,441

(22) Filed: Dec. 23, 2021

(51) Int. Cl.
| | | |
|---|---|---|
| *G01J 3/04* | (2006.01) | |
| *G01J 3/28* | (2006.01) | |
| *G01J 3/02* | (2006.01) | |
| *G01J 3/18* | (2006.01) | |

(52) U.S. Cl.
CPC ............ *G01J 3/2823* (2013.01); *G01J 3/0208* (2013.01); *G01J 3/04* (2013.01); *G01J 2003/1861* (2013.01)

(58) Field of Classification Search
CPC ....... G01J 2003/1861; G01J 2003/2826; G01J 3/04; G01J 3/2823
See application file for complete search history.

(56) References Cited

U.S. PATENT DOCUMENTS

2013/0188664 A1* 7/2013 Xie ..................... G02F 1/3523
359/884

FOREIGN PATENT DOCUMENTS

| CN | 109974852 A | * | 7/2019 | ............ G01J 3/2823 |
| CN | 110501074 A | * | 11/2019 | ......... G01N 21/3563 |
| JP | 2004515778 A | * | 5/2004 | ......... G01N 21/3563 |

OTHER PUBLICATIONS

Website: https://www.cubert-hyperspectral.com/products/ultris-x20 (previously submitted and a screen capture page by page are attached).
Website: https://www.specim.fi/wp-content/uploads/2020/02/Specim-FX10-Technical-Datasheet-04.pdf (previously submitted). Please note the correct webpage address.
Website: https://www.hyspex.com/ (previously submitted and a screen capture copy page by page are attached).
Website: https://www.cubert-hyperspectral.com/products/ultris-x20.
Website: https://www.specim.fi/products/specim-fx10/.
Website: https://www.headwallphotonics.com/products/vnir-400-1000nm.
Isoplane Rev-C1-07292021Datasheet.
Website: https://www.hyspex.com/.

\* cited by examiner

*Primary Examiner* — Maurice C Smith
(74) *Attorney, Agent, or Firm* — DLA Piper LLP (US)

(57) ABSTRACT

A camera includes a first lens configured to focus incoming light onto a reflective slit assembly. The reflective slit assembly comprises an elongated strip of reflective material configured to reflect some but not all of the incoming light as return light. The first lens is configured to at least partially collimate the return light from the elongated strip of reflective material. A first mirror is configured to reflect the return light from the first lens. A second mirror is configured to reflect the return light from the first mirror. An optical element is configured to separate the return light from the first mirror as a function of wavelength. A second lens is configured to focus the return light from the optical element onto a first detector. The first detector is configured to measure intensities of the return light as a function of two dimensional position on the first detector.

19 Claims, 17 Drawing Sheets

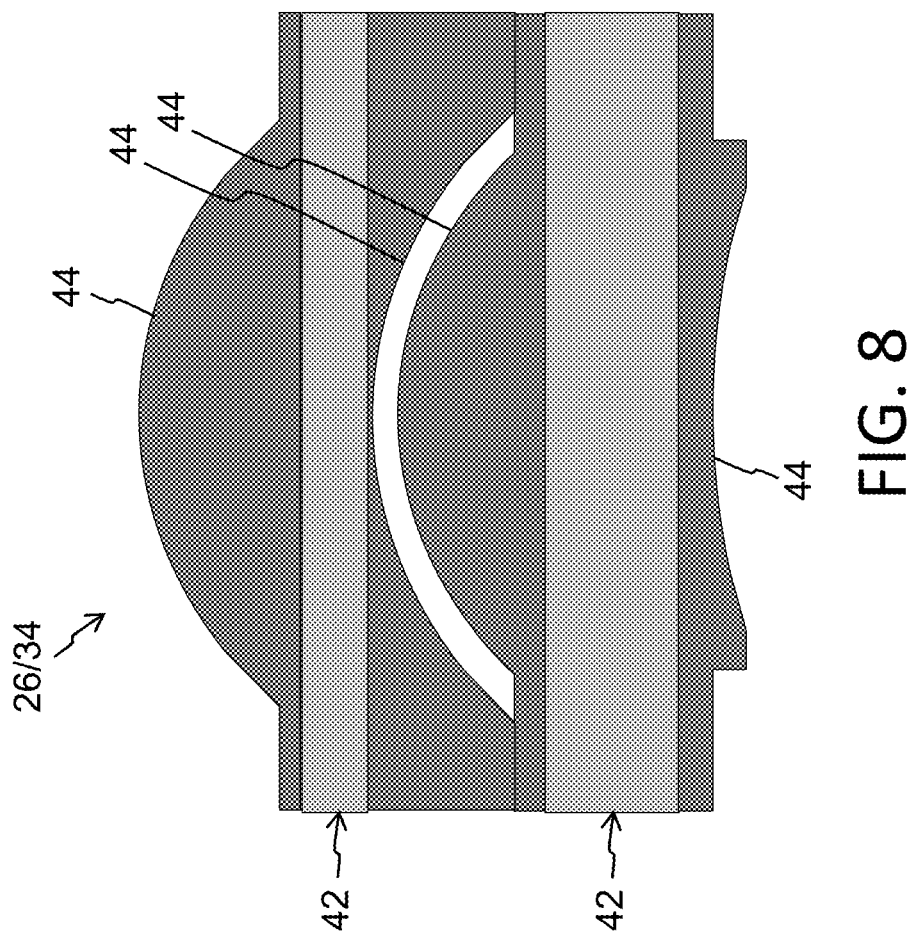

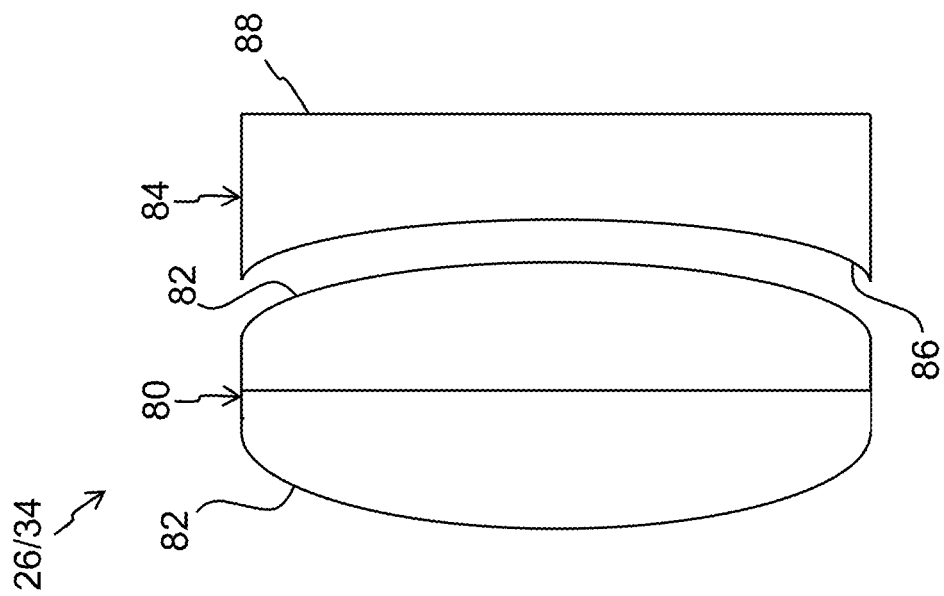

HYPERSPECTRAL CAMERA

FIELD OF THE INVENTION

The present invention relates to spectral imaging, and more particularly to a compact optical system for push broom hyperspectral imaging.

BACKGROUND OF THE INVENTION

Hyperspectral imaging involves collecting spectral data for each pixel in the image of a scene. The spectral data, in combination with the spatial location (i.e., the pixel) from which it originates, can be used to find objects, identify materials, or detecting processes. There are three general types of spectral imagers. There are push broom (line) scanners and whisk broom (point) scanners which involve spatial scanning over time, band sequential scanners which involve spectral scanning that acquire images of an area at different wavelengths, and snapshot hyperspectral imaging which uses an array to generate an image in an instant. Hyperspectral imaging look at objects using a vast portion of the electromagnetic spectrum. Certain objects leave unique 'fingerprints' in the electromagnetic spectrum, especially when combined with the spatial location within the image. Known as spectral signatures, these 'fingerprints' enable identification of the materials or objections that make up a scanned scene.

Push broom hyperspectral imaging involves capturing a strip of the scene and spectrally dispersing the slit image with a prism or grating to collect the spectral data from the strip. FIG. 1 conceptionally shows the push broom imaging concept, where light 1 from a strip 2 of a scene 3 is captured by a camera 4. The light 1 in this example originates from the entire dimension of the scene 3 in the X direction, and from just a narrow portion of the dimension of the scene 3 in the orthogonal Y direction. However, it is also possible to conduct multiple scans of just part of the scene dimension in the X direction. The light 1 is collimated by one or more lenses 5, separated by wavelength using one or more optical elements 6 (e.g., diffraction grating, prism, etc.), and focused onto a detector 7 by one or more lenses 8, as conceptually shown in FIG. 2. In order to capture only a strip of light 1 from the scene at any given time, the light from the scene passes through a transmissive strip (not shown) placed in the optical path between lens 5 and detector 7, which only transmits the strip of light 1 portion of all the light originating from the scene 3. The remaining light from the scene is blocked, scattered or reflected away such that it does not reach the detector 7. The transmissive strip can be, for example, an opaque sheet with an elongated aperture (i.e., a slit) through which the strip of light 1 passes. The detector 7 measures the amplitudes of the wavelength components of the strip of light 1 for each position across the X direction dimension of the image. This spatial and spectral data for the strip 2 of the scene 3 can be represented in a hyperspectral image also referred to as a hyperspectral data cube 9 having two spatial dimensions (X, Y), and one spectral dimension (X), as shown in FIG. 3. The strips 2 of the scene 3 are scanned separately, and the spatial/spectra data from the strips are stitched together to create a full hyperspectral data cube 9 of the scene 3, as shown in FIG. 4. The data value for each pixel within the cube represents the value of a particular wavelength detected at one spatial location within the scene 3. Conventional push broom hyperspectral cameras are large and bulky because of the large number of optical components needed.

There is a need for a push broom hyperspectral imaging device that utilizes a simpler and more compact optical design.

BRIEF SUMMARY OF THE INVENTION

The aforementioned problems and needs are addressed by a camera that includes a first lens configured to focus incoming light onto a reflective slit assembly. The reflective slit assembly comprises an elongated strip of reflective material configured to reflect some but not all of the incoming light as return light. The first lens is configured to at least partially collimate the return light from the elongated strip of reflective material. A first mirror is configured to reflect the return light from the first lens. A second mirror is configured to reflect the return light from the first mirror. An optical element is configured to separate the return light from the first mirror as a function of wavelength. A second lens is configured to focus the return light from the optical element onto a first detector. The first detector is configured to measure intensities of the return light as a function of two dimensional position on the first detector.

Other objects and features of the present invention will become apparent by a review of the specification, claims and appended figures.

BRIEF DESCRIPTION OF THE DRAWINGS

FIG. 8 is a side cross sectional view of the first or second lens.

FIG. 17 is a side cross sectional view of an alternate example of the first or second lens.

DETAILED DESCRIPTION OF THE INVENTION

Figure 2:
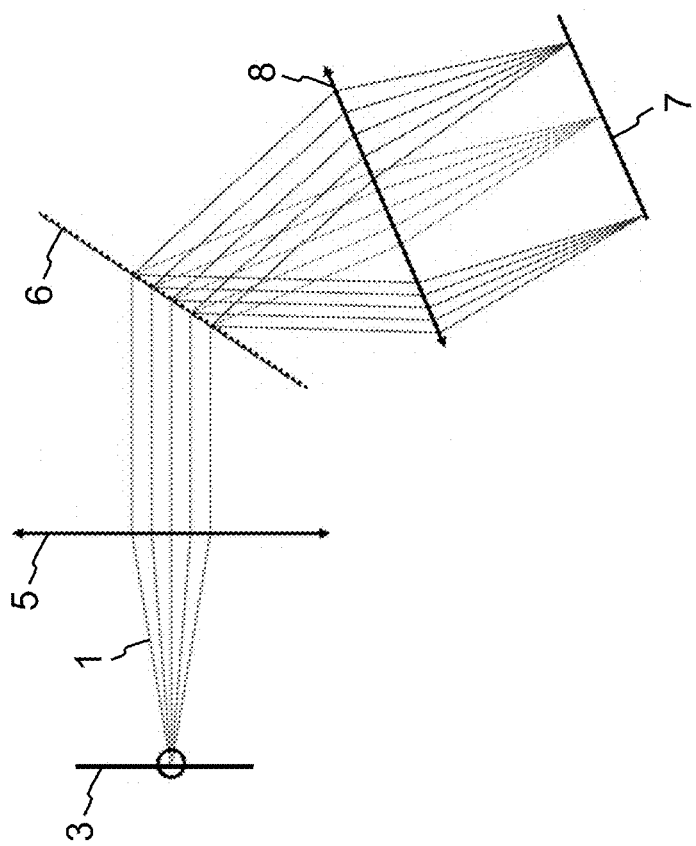
FIG. 2 is a schematic diagram of a conventional hyperspectral camera.
Figure 1:
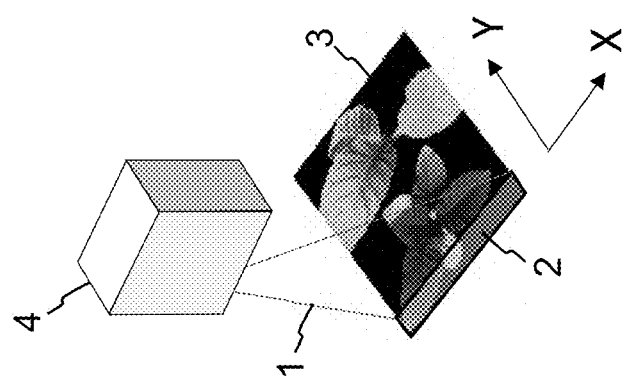
FIG. 1 is a perspective view of a conventional hyperspectral camera.
Figure 4:
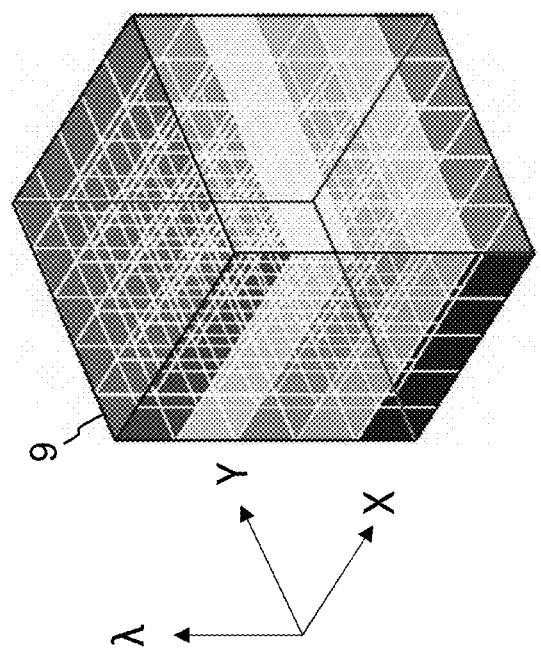
FIG. 4 is a graphical representation of all the pixels within a hyperspectral data cube.
Figure 3:
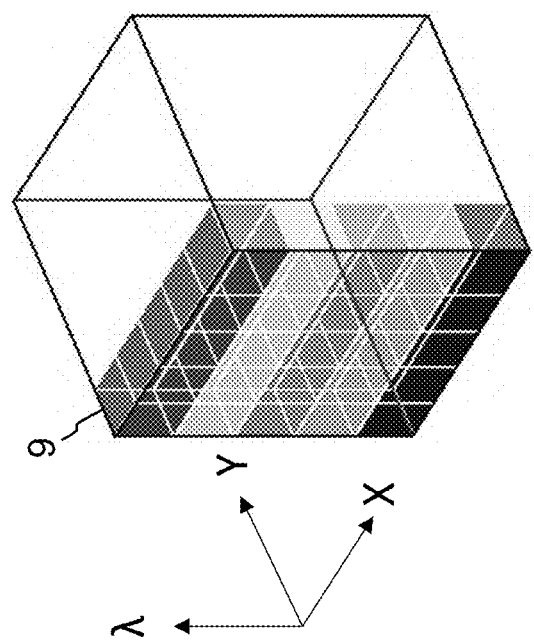
FIG. 3 is a graphical representation of a single line of pixels within a hyperspectral data cube.
Figure 5:
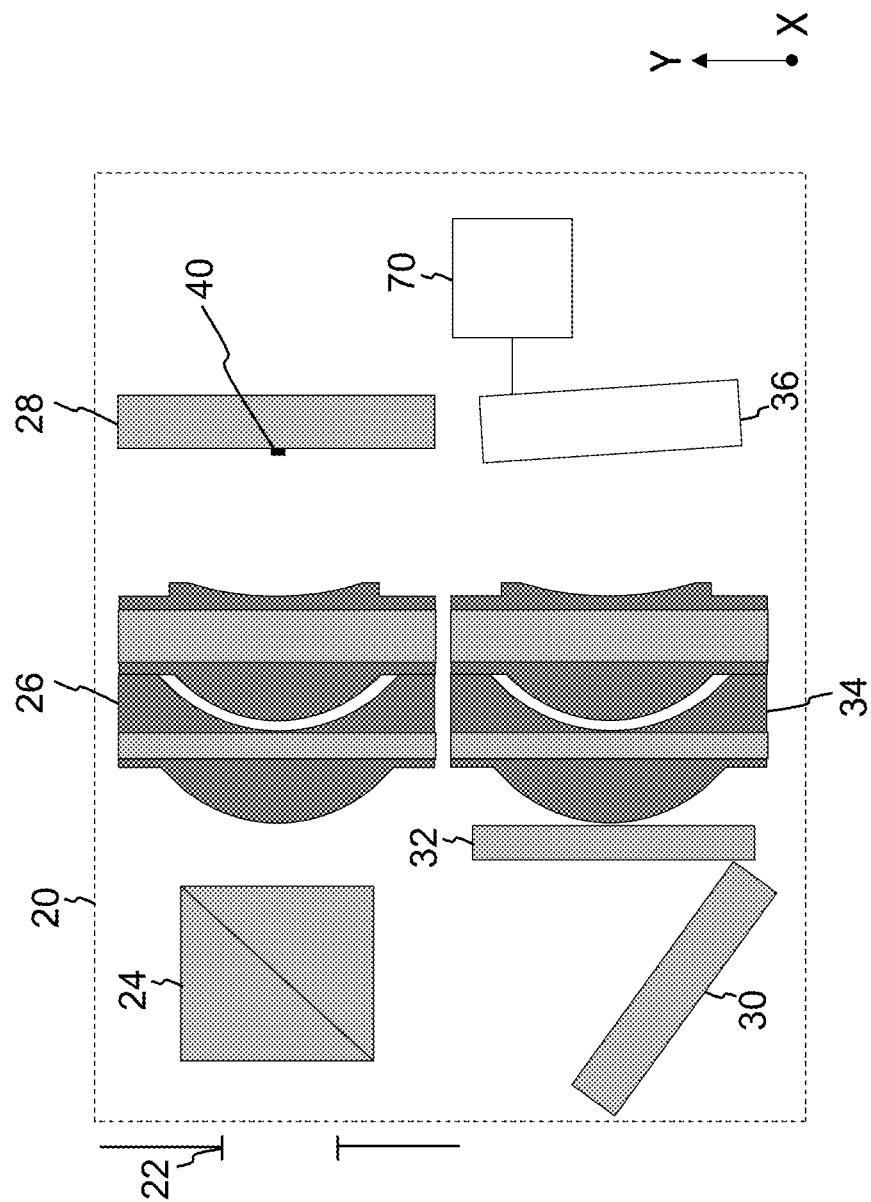
FIG. 5 is a schematic diagram of a camera.

A push broom hyperspectral imaging device type camera that utilizes a simple and compact optical configuration for capturing spatial and spectral data from strip images of a scene is disclosed. FIG. 5 illustrates an example of camera 20, which includes an entrance pupil 22, a first mirror 24, a first lens 26, a reflective slit assembly 28, a second mirror 30, an optical element 32 that separates light as a function of wavelength, a second lens 34 and a (first) detector 36.

Figure 6:
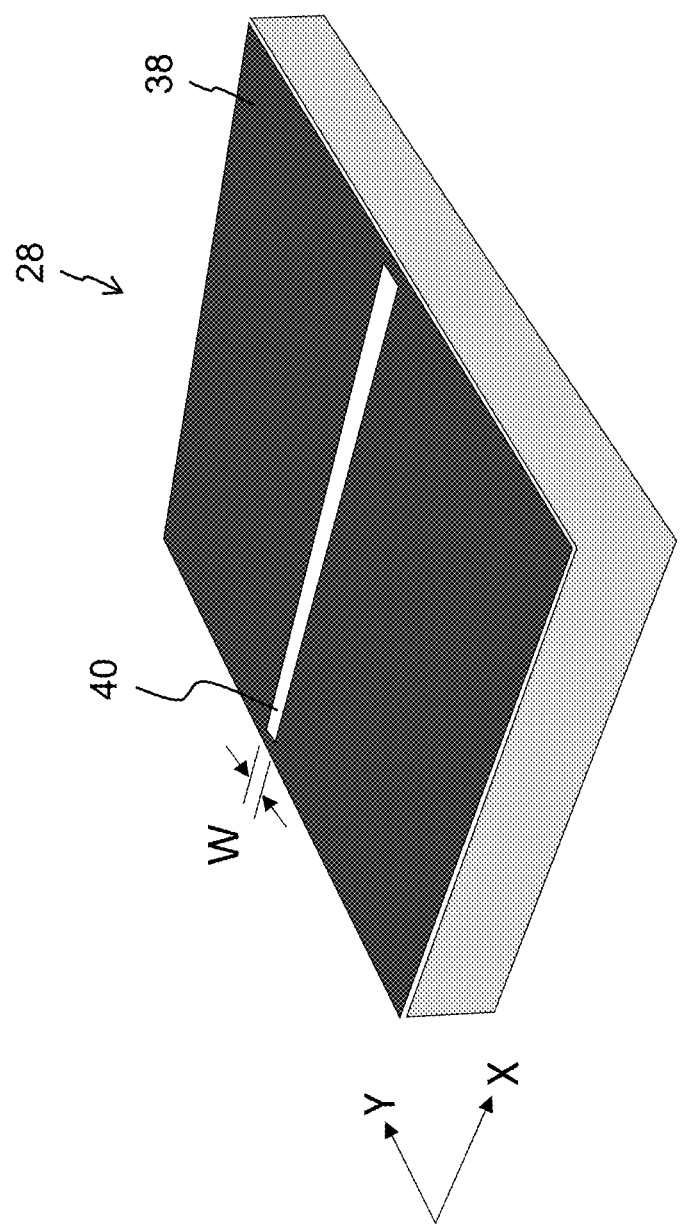
FIG. 6 is a perspective view of the reflective slit.

The entrance pupil 22 is optional, and can be an aperture or transmissive material in an otherwise opaque material through which light from the scene passes. First mirror 24 is semitransparent such that it allows at least some of the light entering through the entrance pupil 22 to pass (i.e., transmit) through first mirror 24. A non-limiting example of first mirror 24 is a 50 percent splitter cube or other type of 50 percent beam splitter or mirror that transmits 50 percent of the light, and reflects 50 percent of the light, incident on it from either direction. First lens 26 focuses the light from the first mirror 24 onto reflective slit assembly 28. Reflective slit assembly 28 (better shown in FIG. 6) has a top surface that is made of, or covered by, light absorbing or scattering material 38 except for an elongated strip of reflective material 40 (also referred to herein as mirror strip 40) having a length L in the (first) X direction and a width W in the (second) Y direction (i.e., the (first) X direction is orthogonal to the (second) Y direction), where length L is greater than width W (i.e., the light absorbing material 38 is immediately adjacent the mirror strip 40). Mirror strip 40 is preferably configured to match the full dimension of the image reaching reflective slit assembly 28 in the X direction, but only a small dimension of the image reaching reflective slit assembly 28 in the Y direction, which is achieved by having length L being greater than width W. The light absorbing or scattering material 38 surrounds mirror strip 40 and is positioned to absorb or scatter the light not being reflected by mirror strip 40. Light absorbing or scattering material 38 can be, for example, metal oxides like black chromium (chromium oxide), silver oxide (Ag2O), etched electroless nickel-phosphor, iron-oxide, black matrix, carbon, di-electric coatings, copper selenide (CuSe5), graphene, as well as commercially available black absorbing materials like Acktar Black, Vantablack, diamond back ADLC, and anodized surfaces. The mirror strip 40 can be, for example, any good light reflecting material, such as $TiO_2$, $SiO_2$, $Ta_2O_5$, Cr, Al, Au, Ag, etc.). As a non-limiting example, width W can be, for example, 1.5 µm, and length L can be, for example, 3-5 mm (e.g., similar to X direction dimension of detector 36).

Figure 7A:
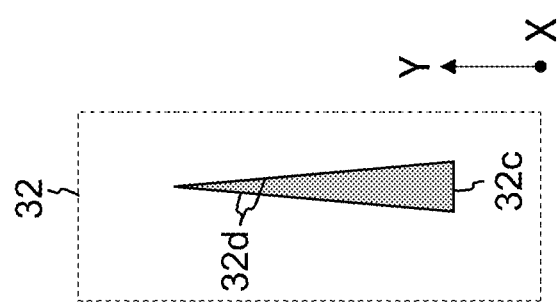
FIG. 7A is a side view of a diffraction grating as the optical element that separates light as a function of wavelength.
Figure 7B:
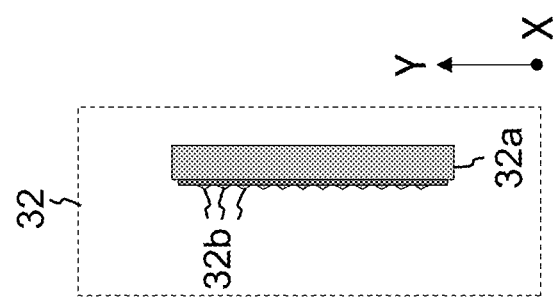
FIG. 7B is a side view of a prism as the optical element that separates light as a function of wavelength.

First mirror 24 is configured to reflect at least some of the light reflected by the mirror strip 40 (and passing through first lens 26) toward second mirror 30. Second mirror 30 reflects light from first mirror 24 toward optical element 32, which separates the incoming light into different directions based on wavelength (e.g., through diffraction or refraction). As a non-limiting example, optical element 32 can be a transmission diffraction grating as shown in FIG. 7A. The transmission diffraction grating can include a transparent substrate 32a having a periodic structure 32b formed thereon or therein that diffracts the light passing through it in different angles as a function of the wavelength of the light. The periodic structure 32b could be, for example, 500 diffraction lines (i.e., elongated ridges and/or valleys) per millimeter that extend lengthwise in the X direction. As another non-limiting example, optical element 32 can be a prism as shown in FIG. 7B. The prism can include a transparent substrate 32c with non-parallel sides 32d (as viewed in the X direction). Second lens 34 focuses the light from the optical element 32 onto the detector 36. Detector 36 can be a two dimensional pixel sensor array (i.e., image sensor) that can resolve the two dimensional image created by the optical elements of the camera 20 by measuring light intensities as a function of two dimensional position on the array. A non-limiting example of detector 36 is one that is 2800 µm square, and has a resolution (i.e. a pixel size) of approximately 1 µm per pixel. The output signals from detector 36 are provided to a processor 70.

First and second lenses 26/34 can be identical to each other. One non-limiting example of each first and second lens 26/34 can be a lens stack with two lens components 42 stacked together so that there are four aspheric surfaces 44 for each lens 26/34, as shown in FIG. 8. More than two lens components 42 can be stacked together if more than four aspheric surfaces 44 are desired. The dimensions of the two lens components 42 of each lens 26/34 can vary from each other, and/or can be made of different materials (as a non-limiting example, two different polymer materials such as acrylate-based polymer and epoxy-based polymer can be used for the two lens components 42 respectively for improved chromatic performance). Lenses 26/34 can be PIM (plastic injection molded lens), molded glass, machined and polished glass, combinations of glass lenses (e.g., achromats), glass replica lenses, wafer-level optics, or any combination thereof.

Figure 9:
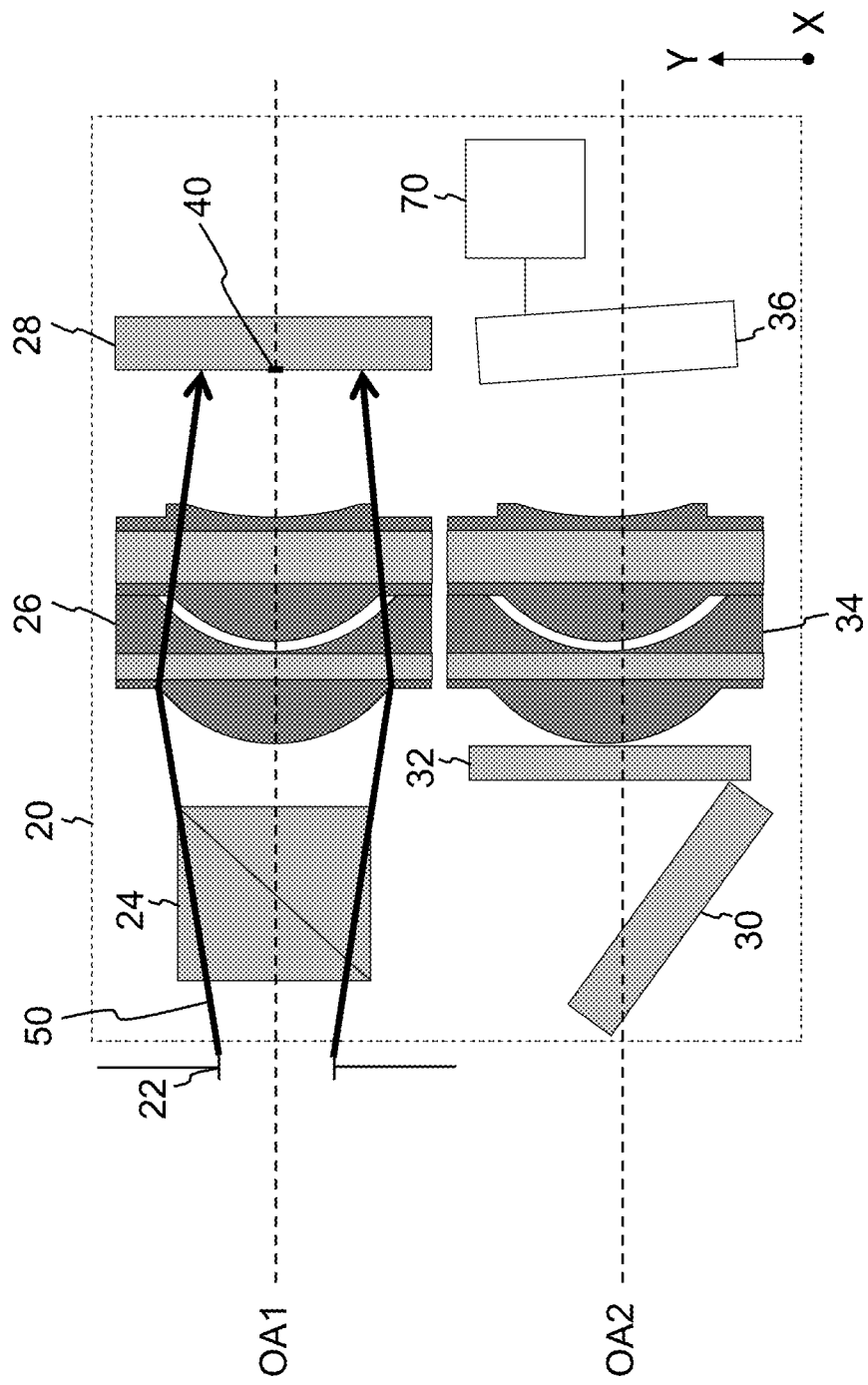
FIG. 9 is a schematic diagram of the camera illustrating the path of incoming light into the camera.
Figure 10:
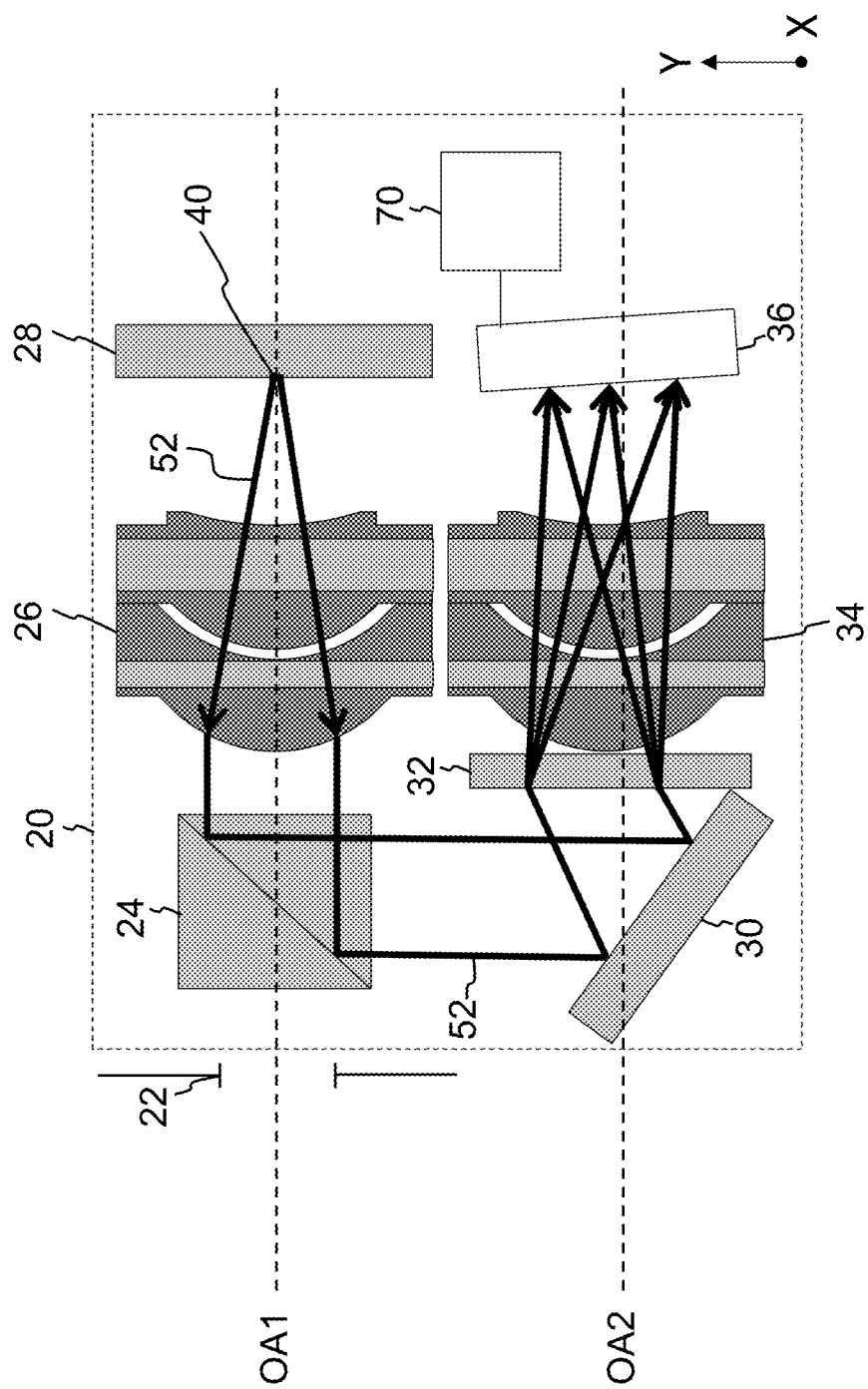
FIG. 10 is a schematic diagram of the camera illustrating the path of return light inside the camera.

Entrance pupil 22, first mirror 24, first lens 26 and reflective slit assembly 28 are arranged along (i.e., a least a portion of each optical element is located on) a first optical axis OA1, and second mirror 30, optical element 32, second lens 34 and detector 36 are arranged along a second optical axis OA2, as shown in FIGS. 9 and 10. Preferably, but not necessarily, optical axes OA1 and OA2 are parallel to each other. Doing so provides the advantage of minimizing the space occupied by the optical elements (i.e., allow for minimizing the footprint taken by all the optical elements. It also simplifies the design of the optical elements (e.g., they can be made on a wafer scale because, for example, the lenses in the wafer would have the same pitch).

Figure 11:
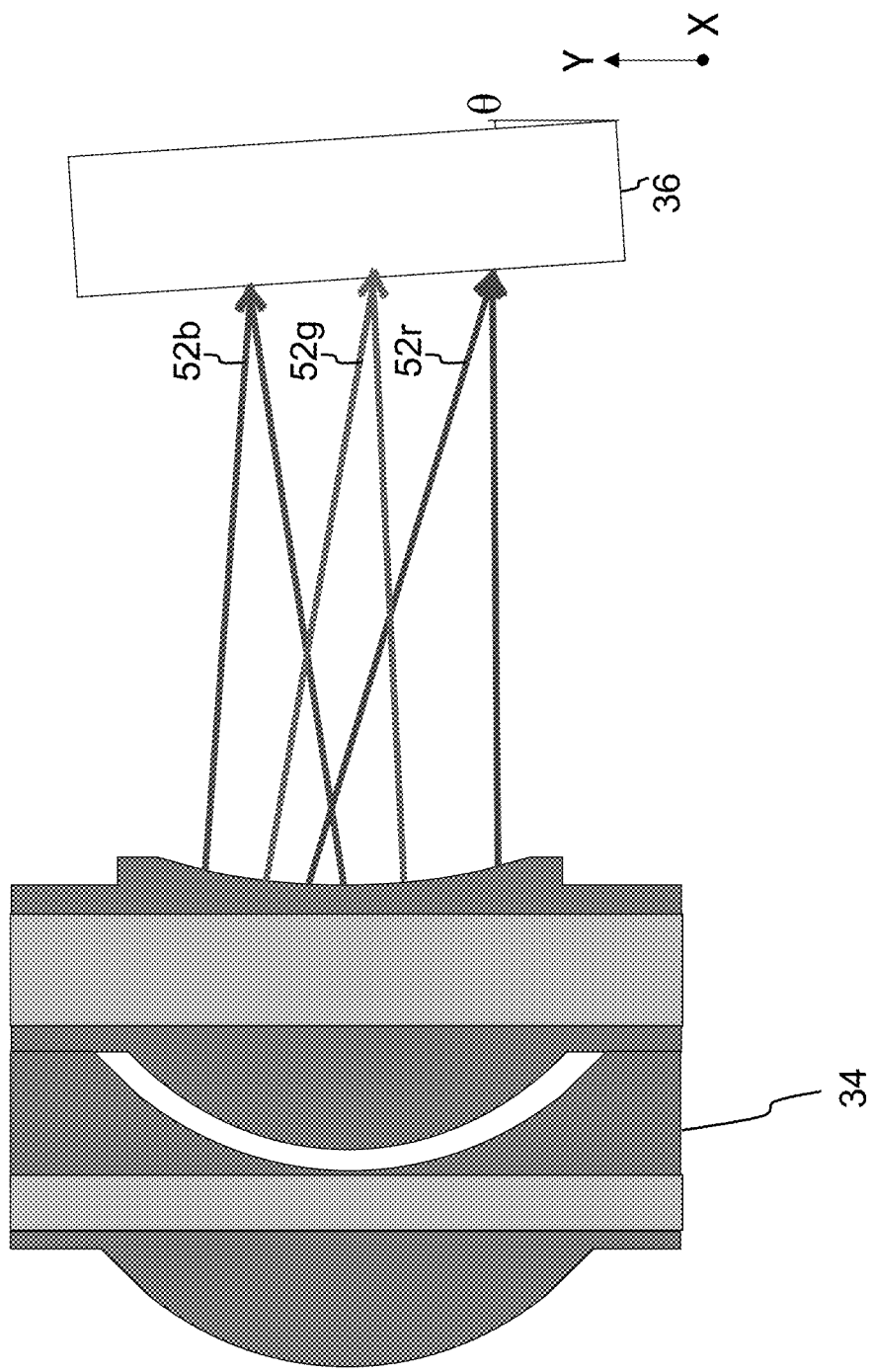
FIG. 11 is a schematic diagram illustrating the separation of light as a function of wavelength within the camera.

In operation, incoming light 50 from the scene being scanned enters the camera 20 through entrance pupil 22 (if one is used), is transmitted through first mirror 24, and is focused by first lens 26 onto reflective slit assembly 28, as shown in FIG. 9. For example, the image of the scene is focused onto the two dimensional area of the reflective slit assembly. Most of the light focused onto the reflective slit assembly 28 is absorbed or scattered. However, the portion of the incoming light 50 focused onto the mirror strip 40 is reflected as return light 52, as shown in FIG. 10. The return light 52 (which corresponds to only a strip of the image of the scene) from the mirror strip 40 passes through first lens 26 where it is collimated or at least partially collimated. The return light from the first lens 26 is reflected by first mirror 24 toward second mirror 30. The return light from the first mirror 24 is reflected by second mirror 30 toward optical element 32. Optical element 32 separates the return light 52 from the first and second mirrors 26/30 based upon wavelength in the dimension orthogonal to the lengthwise direction of mirror strip 40 (i.e., orthogonal to the lengthwise direction of the strip of the scene from which the light originated), and second lens 34 focuses the return light from the first/second mirrors 26/30 and optical element 32 onto detector 36. Specifically, the optical element 32 is configured to separate the return light 52 based upon wavelength in the Y direction, which is orthogonal to the X direction in which the lengthwise direction of mirror strip 40 extends (compare FIGS. 6 and 10). Therefore, the optical configuration of camera 20 preserves the original spatial location of light within the image in the X direction (as reflected by the mirror strip 40), while separating the color components of the light in the Y direction for any given location along the X direction. This result is illustrated in FIG. 11, where for each location along the X direction of the mirror strip 40, the blue wavelength components 52b of the return light 52 are directed to the upper portions of the detector 36 (relative to the Y direction), the green wavelength components 52g of the return light 52 are directed to the center portions of the detector 36 (relative to the Y direction), and the red wavelength components 52r of the return light 52 are directed to the lower portions of the detector 36 (relative to the Y direction). Therefore, the portion of the image that reaches the detector 36 is spatially preserved in the X direction while separated by wavelength in the Y direction. The image is captured by the detector 36 by measuring intensities of the light as a function of two dimensional position on the detector 36. Preferably, the detector 36 is tilted by a tilt angle θ so that the portion of the detector 36 receiving the blue wavelength components 52b is closer to the second lens 34 than the portion of the detector 36 receiving the red wavelength components 52r, to accommodate for the different focal lengths for different wavelengths of light. As a non-limiting example, the tilt angle θ can be 4 degrees. It should also be noted that the angle of mirror 30 can be selected to best match the diffraction/refraction angle of optical element 32.

As shown in FIGS. 9-11, only light from a single narrow strip within the image of the scene being scanned is directed to the detector 36 at any given time. To scan the entire scene, the camera 20 can be moved relative to the scene being scanned, or optics can be used to shift the incoming light relative to the optics of the camera, whereby data can be sequentially captured for individual strips of the scene being scanned. Camera 20 can include (or be connected to) processor 70 for processing the signals from detector 36 to, for example, process the spatial and spectral data represented by the signals from detector 36. That data processing can include creating a hyperspectral data cube or other hyperspectral images that represent the collected data and in turn represent the scene being scanned, including piecing together the data collected from individual strips of the scene being sequentially scanned. The data processing can also include comparing the spatial and spectral data to a library of known values in order to identify the scene, one or more objects in the scene, and/or or materials in the scene.

Figure 12:
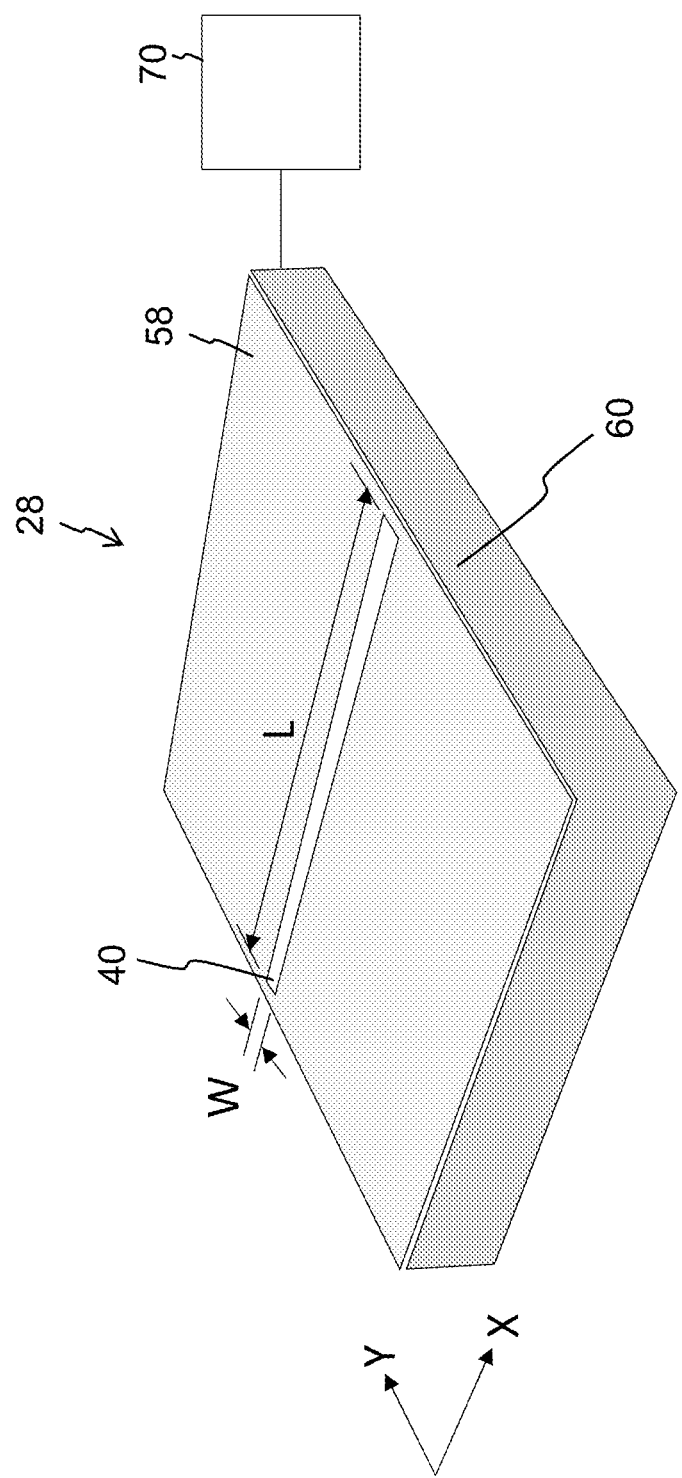
FIG. 12 is a perspective view of an alternate example of the reflective slit assembly.
Figure 13:
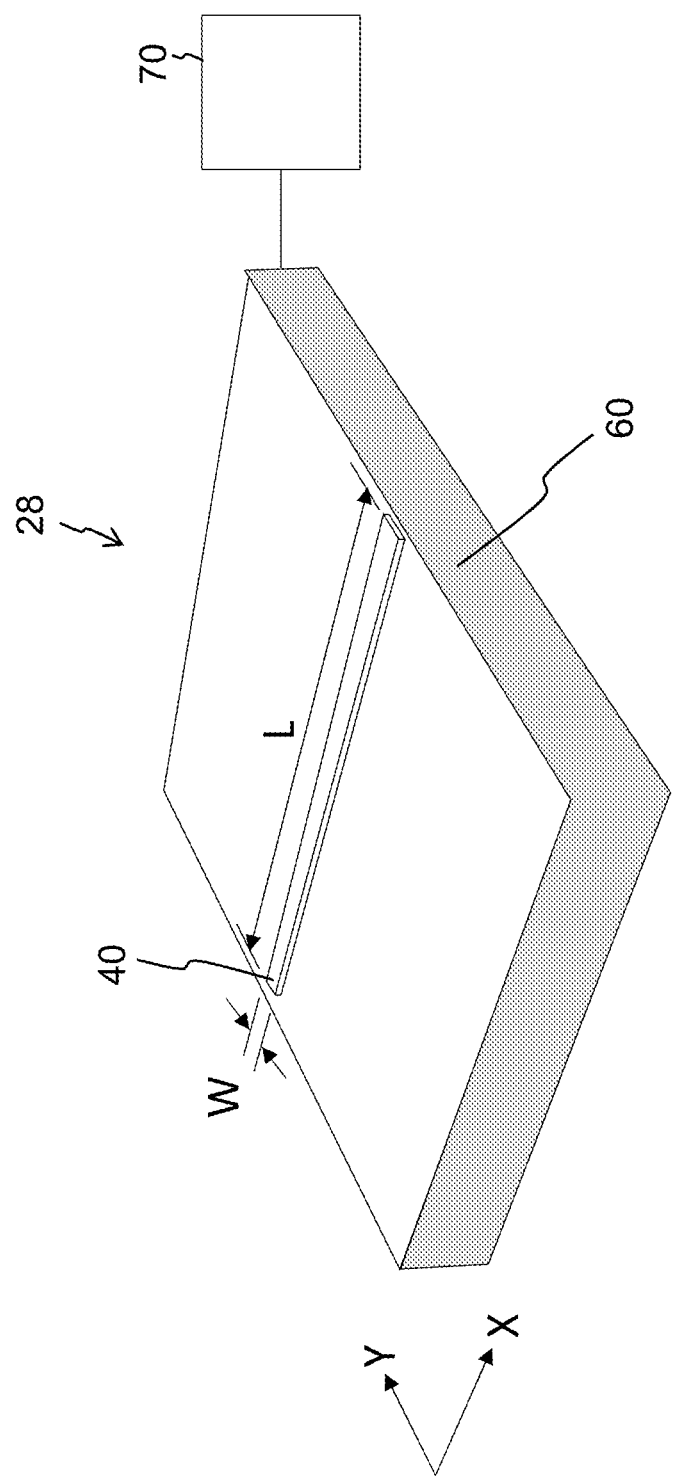
FIG. 13 is a perspective view of an alternate example of the reflective slit assembly.

FIG. 12 illustrates an alternate example, where reflective slit assembly 28 includes a (second) detector 60 covered by transmissive material 58 and mirror strip 40, so that a full image of the scene being focused onto the reflective slit assembly 28 by the first lens 26 can be captured and measured (i.e., by measuring intensities of the light as a function of two dimensional position on the detector 60). The image detected by detector 60 would have a thin strip missing, corresponding to the location of mirror strip 40. If desired, that missing strip of the image can be filled in by processor 70 either by extrapolating from the adjacent data or by using the signals from detector 36 that represent that portion of the image that is missing. FIG. 13 illustrates another alternate example, where transmissive material 58 is omitted.

Figure 14:
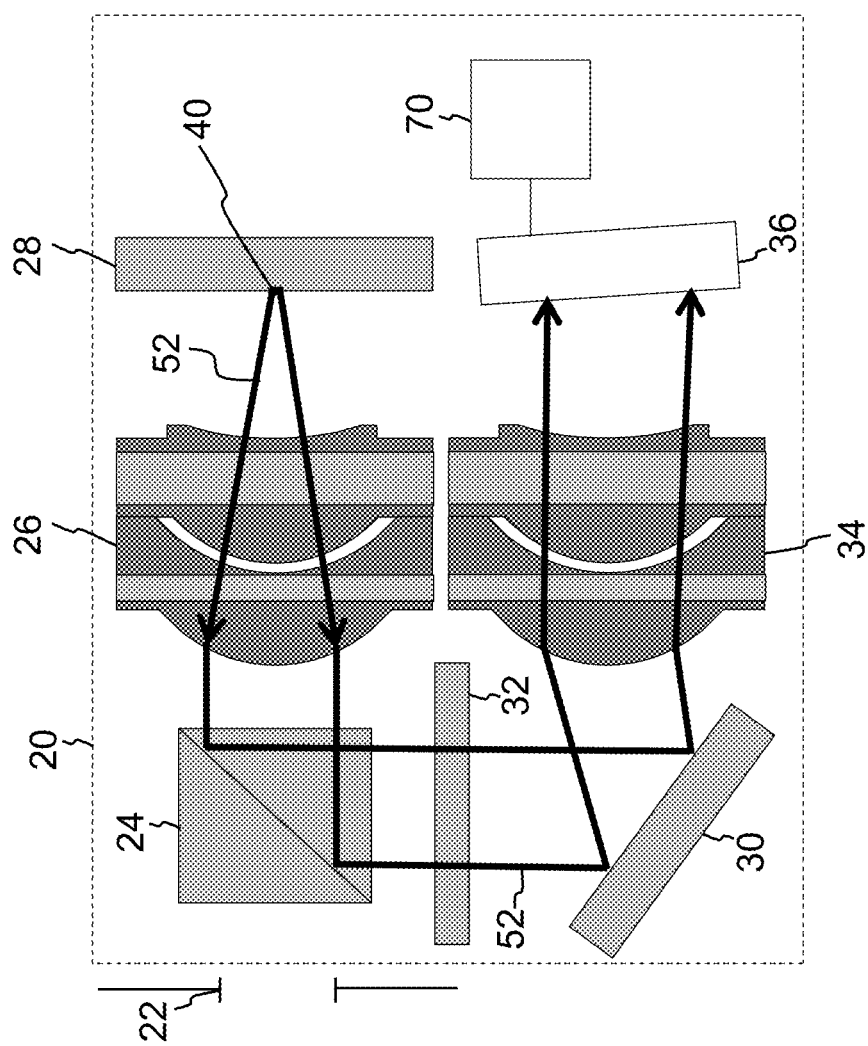
FIG. 14 is a schematic diagram of an alternate example of the camera.

Wavelength separation need not occur after the return light 52 is reflected by second mirror 30. For example, as illustrated in FIG. 14 (but with simplified representations of the light rays after optical element 32), optical element 32 can be disposed between first and second mirrors 24/30, instead of between second mirror 30 and second lens 34 as shown in FIG. 5. In this example, the return light 52 from the first mirror 24 is separated by wavelength before being reflected by second mirror 30.

Figure 15A:
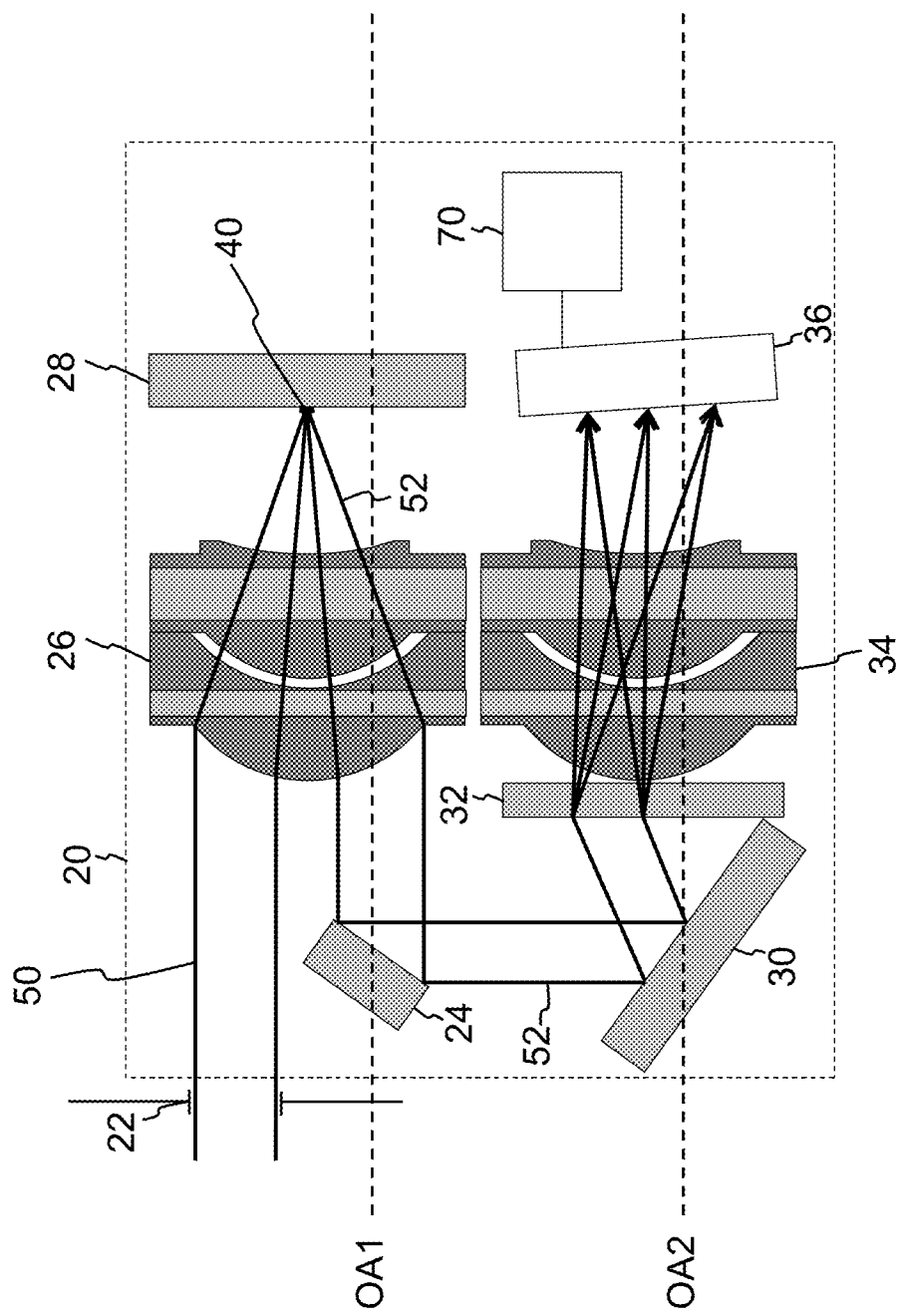
FIGS. 15A and 15B are schematic diagrams of alternate examples of the camera.
Figure 15B:
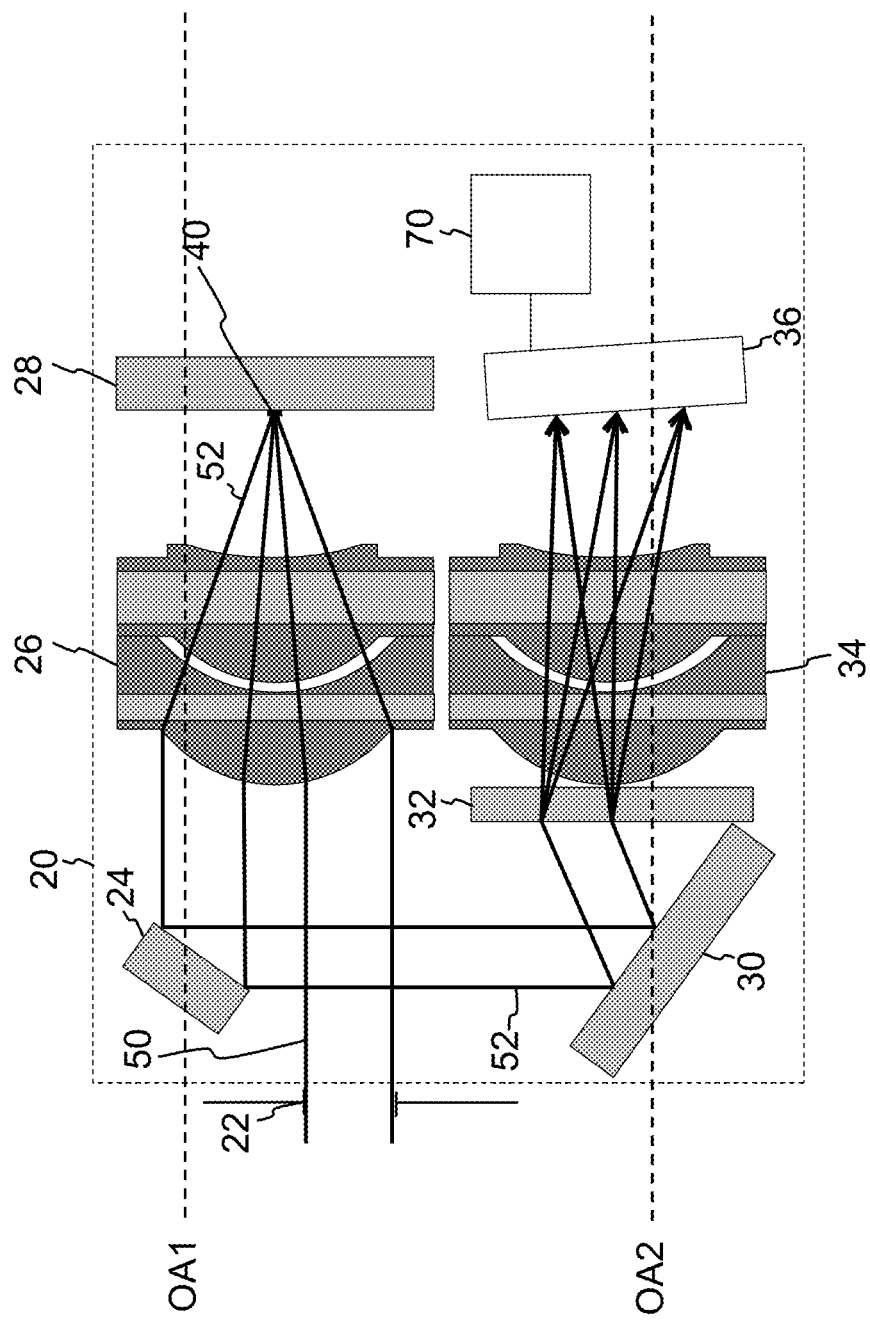
Figure 16A:
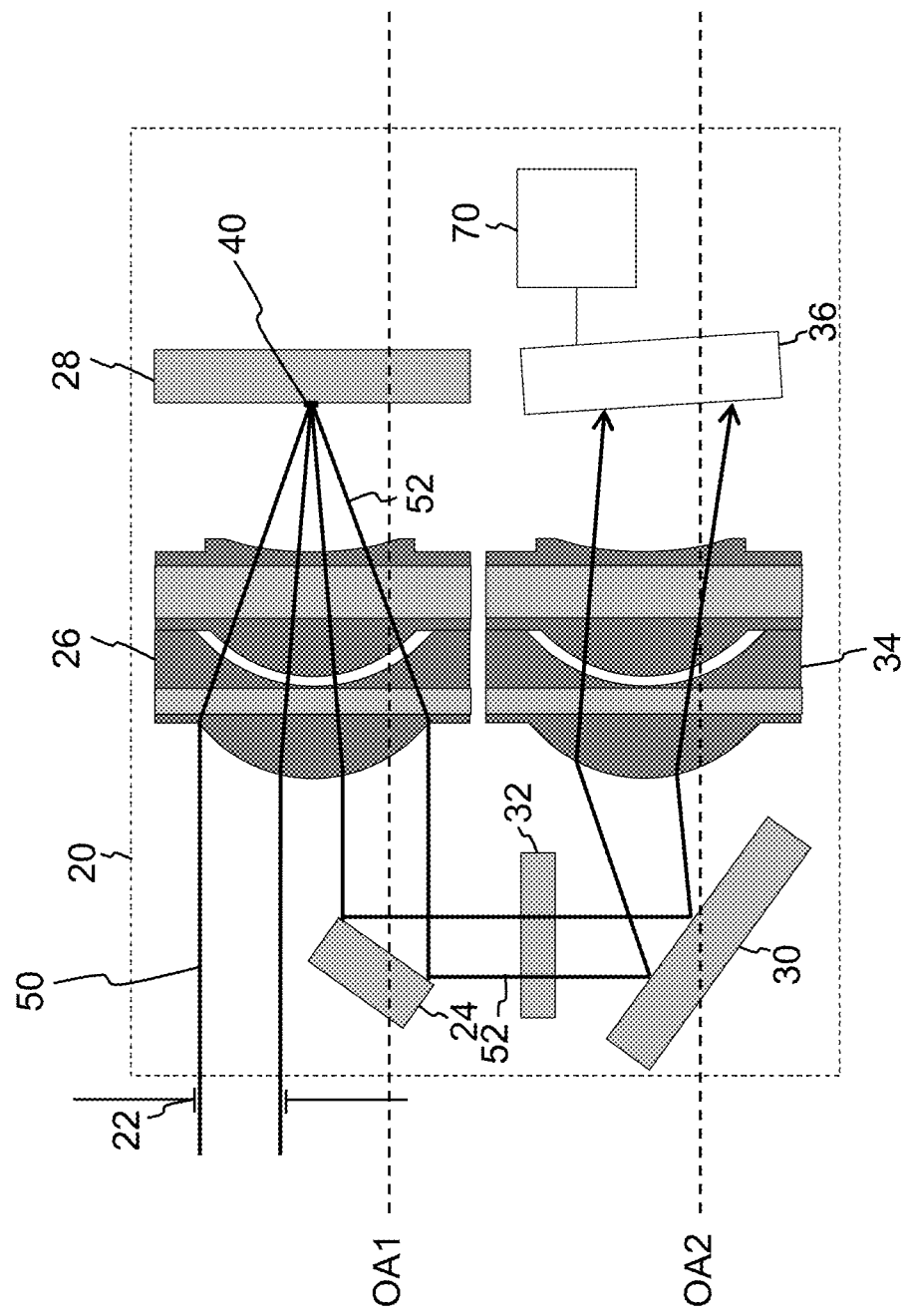
FIGS. 16A and 16B are schematic diagrams of alternate examples of the camera.
Figure 16B:
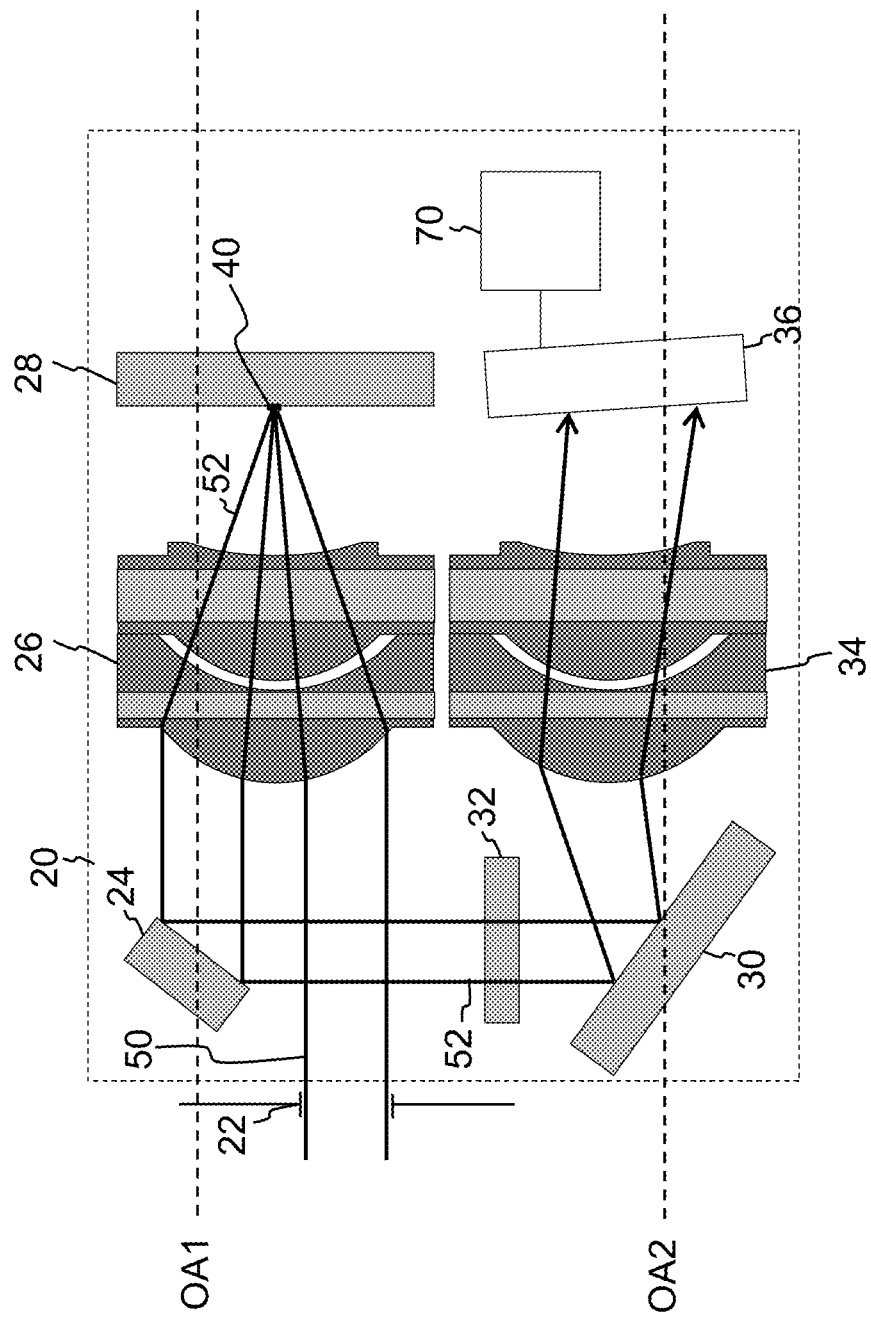

FIGS. 15A and 15B illustrate alternate examples, where the first mirror 24 is positioned such that the incoming light 50 bypasses first mirror 24 in reaching first lens 26 (e.g., the first mirror 24 is not positioned directly between entrance pupil 22 and first lens 26, so the incoming light can proceed to first lens 26 without encountering first mirror 24). The first mirror 24 is positioned to reflect all of the return light 52 from reflective slit assembly 28. The advantage of this optical configuration is that there is no loss of a portion of the incoming light 50 caused by passing through the first mirror 24. Incoming light 50 completely avoids first mirror 24. Further, first mirror 24 can be a high reflecting element that reflects all (or virtually all) of the return light 52. The avoidance of light loss for both the incoming light 50 (by not having to pass through first mirror 24) and return light 52 (by avoiding configuring first mirror 24 to reflect only some of the return light 52), will increase the levels of light reaching detector 36 (i.e., increasing any signal to noise ratio). FIGS. 16A and 16B illustrate the optical configurations of FIGS. 15A and 15B (but with simplified representations of the light rays after optical element 32), except optical element 32 is disposed between first and second mirrors 24/30, instead of between second mirror 30 and second lens 34.

FIG. 17 illustrates another non-limiting example for first and second lenses 26/34, which includes first lens component 80 and second lens component 84. The first lens component 80 includes two opposing, convex, spheric surfaces 82. First lens component can be a single element, or can be two elements glued together as shown in FIG. 17. As a non-limiting example, first lens component 80 can be formed of type N-BAK4 glass. The spheric surfaces 82 can be uncoated, or can be coated (as a non-limiting example, the coating can be an acrylic polymer of approximately 0.03 mm thickness, which can optimize resolution across the field of view). The second lens component 84 includes two opposing surface 86 and 88, where surface 86 is concave, spheric and faces the first lens component 80, and surface 88 is planar. As a non-limiting example, second lens component 84 can be formed of type N-SF11 glass. Surfaces 86 and 88 can be uncoated or coated. As a non-limiting example, the total thickness of the first and second lens components 80 and 84 can be approximately 10 mm.

Camera 20 has many advantages. The camera includes only two lenses 26/34 (where the lens 26 is used bidirectionally to focus light onto the reflective slit assembly 28 and focus light reflected from reflective slit assembly 28), two mirrors and a folded design whereby the optical components are arranged on two parallel optical axes. Thus, the size of the camera can be made to be relatively small, to enable the camera 20 to be wearable, or integrated into a mobile device such as a cell phone. The camera 20 has no moving parts, simplifying operation, reducing power consumption, and providing increased reliability. The optical system provides increased resolution compared to other camera systems with larger and more numerous optical components. The use of reflective slit assembly 28 allows for the inclusion of optional detector 60 positioned along the first optical axis OA1 without blocking the light reflected by mirror strip 40 to optical element 32 and detector 36. Processor 70 can combine the data from both detector 36 and detector 60 to create an overlay image of a regular image (from detector 60) and a hyperspectral image (from detector 36).

It is to be understood that the present invention is not limited to the example(s) described above and illustrated herein, but encompasses any and all variations falling within the scope of any claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A camera, comprising:
   a first lens configured to focus incoming light onto a reflective slit assembly, wherein the reflective slit assembly comprises an elongated strip of reflective material configured to reflect some but not all of the incoming light as return light;
   wherein the first lens is configured to at least partially collimate the return light from the elongated strip of reflective material;
   a first mirror configured to reflect the return light from the first lens;
   a second mirror configured to reflect the return light from the first mirror;
   a prism or a grating positioned to separate the return light from the first mirror as a function of wavelength; and
   a second lens configured to focus the return light from the prism or the grating onto a first detector, wherein the first detector is configured to measure intensities of the return light as a function of two dimensional position on the first detector.

2. The camera of claim 1, further comprising:
   a processor configured to create a hyperspectral image from the intensities of light measured by the first detector.

3. The camera of claim 1, wherein:
   the first mirror, the first lens and the reflective slit assembly are arranged along a first optical axis; and
   the second mirror, the second lens and the first detector are arranged along a second optical axis that is parallel to the first optical axis.

4. The camera of claim 3, wherein the prism or the grating is arranged along the second optical axis.

5. The camera of claim 1, wherein the prism or the grating is a transmission diffraction grating.

6. The camera of claim 1, wherein the prism or the grating is a prism.

7. The camera of claim 1, wherein:
   the elongated strip of reflective material has a length L and a width W;
   the length L is greater than the width W;
   the length L extends in a first (X) direction; and
   the prism or the grating is positioned to separate the return light as a function of wavelength in a second (Y) direction that is orthogonal to the first (X) direction.

8. The camera of claim 7, wherein the prism or the grating is a grating that includes diffraction lines that extend lengthwise in the first (X) direction.

9. The camera of claim 1, wherein the prism or the grating is disposed between the second mirror and the second lens.

10. The camera of claim 1, wherein the prism or the grating is disposed between the first mirror and the second mirror.

11. The camera of claim 1, wherein the first mirror is configured to transmit the incoming light to the first lens.

12. The camera of claim 11, wherein the first mirror is a 50 percent beam splitter.

13. The camera of claim 1, wherein the first lens comprises a lens stack having at least four aspheric surfaces.

14. The camera of claim 1, wherein the second lens comprises a lens stack having at least four aspheric surfaces.

15. The camera of claim 1, wherein the first lens comprises:
   a first lens component that includes two opposing convex spheric surfaces; and
   a second lens component a first concave surface facing the first lens component and a second planar surface.

16. The camera of claim 1, wherein the second lens comprises:
   a first lens component that includes two opposing convex spheric surfaces; and
   a second lens component a first concave surface facing the first lens component and a second planar surface.

17. The camera of claim 1, wherein the reflective slit assembly comprises light absorbing material immediately adjacent the elongated strip of reflective material.

18. The camera of claim 1, wherein the reflective slit assembly further comprises:
   a second detector configured to measure intensities of incoming light focused by the first lens as a function of two dimensional position on the second detector.

19. The camera of claim 18, further comprising:
   a processor configured to create an overlay image from the intensities of light measured by the first detector and from the intensities of light measured by the second detector.

* * * * *